United States Patent
Igari

(10) Patent No.: US 10,189,473 B2
(45) Date of Patent: Jan. 29, 2019

(54) DRIVE TORQUE CONTROL METHOD AND DRIVE TORQUE CONTROL DEVICE FOR VEHICLE

(71) Applicant: Robert Bosch GmbH, Stuttgart (DE)

(72) Inventor: Yoshihide Igari, Kanagawa (JP)

(73) Assignee: Rober Bosch GmbH, Stuttgart (DE)

( * ) Notice: Subject to any disclaimer, the term of this patent is extended or adjusted under 35 U.S.C. 154(b) by 91 days.

(21) Appl. No.: 15/122,507

(22) PCT Filed: Feb. 27, 2015

(86) PCT No.: PCT/JP2015/055851
§ 371 (c)(1),
(2) Date: Aug. 30, 2016

(87) PCT Pub. No.: WO2015/133396
PCT Pub. Date: Sep. 11, 2015

(65) Prior Publication Data
US 2017/0120901 A1    May 4, 2017

(30) Foreign Application Priority Data
Mar. 3, 2014    (JP) .................................. 2014-040671

(51) Int. Cl.
*B60W 30/02* (2012.01)
*B60W 40/11* (2012.01)
(Continued)

(52) U.S. Cl.
CPC ............. *B60W 30/02* (2013.01); *B60K 28/14* (2013.01); *B60W 40/11* (2013.01); *F02D 29/02* (2013.01);
(Continued)

(58) Field of Classification Search
None
See application file for complete search history.

(56) References Cited

U.S. PATENT DOCUMENTS

2002/0039951 A1   4/2002  Hasegawa
2009/0062069 A1*  3/2009  Nedachi .................. F16H 61/16
                                                                477/97
(Continued)

FOREIGN PATENT DOCUMENTS

DE    102005028995 A1    1/2007
DE    102009001306 A1    9/2010
(Continued)

OTHER PUBLICATIONS

Takahashi, Machine translation of JP 2010-229912, Oct. 2010, espacenet.com (Year: 2010).*

(Continued)

*Primary Examiner* — David P. Merlino
(74) *Attorney, Agent, or Firm* — Michael Best & Friedrich LLP

(57) ABSTRACT

To provide drive torque control capable of avoiding acceleration failure even when a wheelie occurs.

A drive torque control method for a vehicle detects or computes a wheelie amount of the vehicle, reduces drive torque that is applied to a rear wheel to be lower than the drive torque in a normal state when the wheelie occurs, and maintains or increases the drive torque when the wheelie amount is reduced.

13 Claims, 6 Drawing Sheets

(51) Int. Cl.
*F02D 41/02* (2006.01)
*F02D 29/02* (2006.01)
*B60K 28/14* (2006.01)
*B60W 30/04* (2006.01)

(52) U.S. Cl.
CPC ..... *F02D 41/021* (2013.01); *B60W 2030/041* (2013.01); *B60W 2300/36* (2013.01); *B60W 2510/22* (2013.01); *B60W 2520/105* (2013.01); *B60W 2520/16* (2013.01); *B60W 2520/18* (2013.01); *B60W 2520/28* (2013.01); *B60W 2710/0666* (2013.01); *F02D 2250/26* (2013.01)

(56) References Cited

U.S. PATENT DOCUMENTS

| | | | | |
|---|---|---|---|---|
| 2011/0160973 | A1* | 6/2011 | Matsuda | B60T 8/1706 |
| | | | | 701/70 |
| 2011/1060973 | | 6/2011 | Matsuda | |
| 2012/0031696 | A1* | 2/2012 | Wagner | B60T 8/1706 |
| | | | | 180/282 |
| 2013/0261914 | A1* | 10/2013 | Ingram | B60W 30/143 |
| | | | | 701/70 |
| 2013/0261925 | A1* | 10/2013 | Kobayashi | B60K 28/16 |
| | | | | 701/85 |

FOREIGN PATENT DOCUMENTS

| | | | | |
|---|---|---|---|---|
| DE | 102012009203 | | 11/2013 | |
| DE | 102012009203 | A1 * | 11/2013 | ............. B62M 6/45 |
| EP | 2031281 | | 3/2009 | |
| GB | 2386103 | | 9/2003 | |
| JP | 2007245993 | | 9/2007 | |
| JP | 2010229912 | | 10/2010 | |
| JP | 2013209047 | | 10/2013 | |

OTHER PUBLICATIONS

Unger; Machine translation of DE-102012009203-A1; Nov. 2013; espacenet.com (Year: 2013).*

Justin726; A guide for learning wheelies; Jun. 2004; The Sportbike Network; sportbikes.net (Year: 2004).*

International Search Report for Application No. PCT/JP2015/055851 dated Apr. 7, 2015 (English Translation, 1 page).

* cited by examiner

DRIVE TORQUE CONTROL METHOD AND DRIVE TORQUE CONTROL DEVICE FOR VEHICLE

BACKGROUND OF THE INVENTION

The invention relates to drive torque control for a vehicle and, in particular, to a drive torque control method and a drive torque control device capable of controlling a wheelie as a phenomenon in which a front wheel comes off the ground during acceleration as well as to a vehicle including the same.

A vehicle, for example, a typical two-wheeled vehicle (a motorcycle) has a rear wheel as a drive wheel, and a vehicle body is accelerated by the rear wheel. At this time, due to a positional relationship between a point at which the rear wheel contacts a road surface and center of gravity of the vehicle body, specified moment is generated in terms of the gravity. This moment that is generated during acceleration is moment that acts in a direction to cause a front wheel of the two-wheeled vehicle to come off the ground. Accordingly, when an abrupt accelerating operation is performed during traveling of the two-wheeled vehicle, the front wheel may come off the ground. Such a phenomenon is generally referred to as a "wheelie".

In addition to the case where the abrupt accelerating operation is performed, the wheelie also occurs in a case where a clutch is abruptly connected at a start or the like. Meanwhile, many of the two-wheeled vehicles that are available in the market in recent years are lightweight and high-powered. Thus, the wheelie is more likely to occur to the latest high-output two-wheeled vehicles than to conventional two-wheeled vehicles. In particular, this tendency is more intense for motocross bikes and supermoto bikes which are lightweight and each of which has the vehicle body with the high center of gravity. When the wheelie occurs, the vehicle body becomes unstable. Thus, a typical rider tries to reduce the wheelie by reducing an operation amount of an accelerator or by actuating a rear brake.

However, the wheelie suddenly occurs depending on a condition, and the typical rider may not be able to appropriately handle the wheelie. For this reason, drive torque control that can prevent the wheelie or terminate the wheelie in an early stage regardless of the rider's intention has been suggested. In order to execute the drive torque control for reducing the wheelie, the wheelie needs to be detected as a precondition. These methods for detecting the wheelie and executing the drive torque control are largely divided into two categories. One is based on traction control, and the other is based on information from various sensors that are attached to the vehicle body.

First, in the method based on the traction control, feedback control is executed on the basis of a difference between front and rear wheel speeds, and the wheelie is thereby reduced. More specifically, the front wheel remains off the ground while the wheelie occurs. Thus, the front wheel speed is reduced, and a speed difference thereof from the rear wheel speed is generated. Based on this speed difference, drive torque (that is, engine output torque) of the rear wheel is reduced.

Next, in the method using the information from the various sensors, a wheel speed sensor, an acceleration sensor, a suspension stroke sensor, an angular speed (gyroscopic) sensor, and the like are used. The acceleration sensor detects acceleration of the two-wheeled vehicle with respect to the road surface. The acceleration is combined with the information, such as a position of the center of gravity of a vehicle body and a vehicle body weight, and, when the acceleration exceeds a specified value, the occurrence of the wheelie can be predicted. In addition, the wheel speed sensor detects a wheel speed, and the acceleration of the vehicle body can be computed from the wheel speed. Thus, similar to the case of the acceleration sensor, there is a case where the wheelie can be detected.

Furthermore, the suspension stroke sensor can detect a stroke (an expanding amount or a contracting amount) of a suspension. When the wheelie occurs, an external force from the road surface is no longer applied to a front fork. Thus, the stroke in the maximum length is detected. In this way, the wheelie is detected. Moreover, the angular speed sensor is a sensor for detecting angular speeds around the center of gravity of the vehicle body. Of these, a pitch angular speed is used to detect the occurrence of the wheelie. When the wheelie occurs, the drive torque (that is, the engine output torque) of the rear wheel is reduced on the basis of at least one type of the information from these sensors. As a specific example, a wheelie state is detected by the angular speed sensor, and engine output reduction control is executed in accordance with a degree of the wheelie (see JP-A-2010-229912).

FIG. 6 includes schematic charts for explaining conventional drive torque control that is executed in a case of the wheelie. In FIG. 6(A), a horizontal axis indicates time, and a vertical axis indicates the wheel speeds of the front wheel and the rear wheel. Here, a one-dot chain line represents a wheel speed 101F of the front wheel, and a broken line represents a wheel speed 101R of the rear wheel. In addition, in FIG. 6(B), a horizontal axis indicates the time, and a vertical axis indicates the drive torque of the rear wheel. Here, a broken line represents a drive torque request 111D from a rider, and a one-dot chain line represents drive torque 111R that is actually applied to the rear wheel. In these charts, the wheelie occurs at time T1, and the wheelie ends at time T3. As it is understood from FIG. 6(A), the wheel speed 101F of the front wheel is increased in the same manner as the wheel speed of the rear wheel until the time T1, and is reduced from the time T1 to time T2. This is because the front wheel comes off the road surface due to the wheelie and rotary power from the road surface that is generated by traveling is no longer generated. On the other hand, because the rear wheel is the drive wheel, the wheel speed 101R is increased in proportion to an increase in a vehicle speed.

In such a case, irrespective of the drive torque request 111D from the rider, the drive torque 111R that is actually applied to the rear wheel is reduced at the time T1, at which the wheelie occurs. Then, at the time T2 at which the wheelie ends, the reduced drive torque 111R is controlled in a direction of an increase. Thereafter, a specified period is required for the actual drive torque 111R of the rear wheel to reach the same level as the drive torque request 111D from the rider.

SUMMARY OF THE INVENTION

However, the above-described conventional drive torque control has following problems. That is, in the method based on the traction control, the feedback control is executed on the basis of the wheel speed difference between the front and rear wheels. Accordingly, while the front wheel comes off the ground in a wheelie state, the drive torque is always in a state of being lower than that in a normal state. Also, in the method of executing the drive torque control by using the information from the various sensors, control for continuously reducing the drive torque is executed from a time when the occurrence of the wheelie is detected to a time when the end of the wheelie is detected.

On the contrary to this, the drive torque does not always have to be reduced in a state where the wheelie continues. For example, the front wheel comes off the road surface and reaches the highest point. Thereafter, the front wheel is lowered and contacts the road surface, and the wheelie ends. At this time, it is also considered that, even when the drive torque is not reduced at a time point at which the front wheel starts being lowered, an amount of the wheelie is not increased any further. Rather, it is often preferred to execute control for increasing the drive torque so as to obtain favorable accelerating power.

In addition, when the slight wheelie occurs (the wheelie amount is small) and the front wheel is in a state of attempting to come off the ground (in the middle of an increase in a pitch angle), the front wheel is not usually lifted any further even without reducing the drive torque. Thus, when the wheelie is slight, the drive torque may not have to be reduced. However, as described above, in the conventional drive torque control, whether the wheelie occurs is set as a condition for the drive torque control. Accordingly, the drive torque is excessively reduced, which results in problems such as acceleration failure and generation of a significant shock at a time when the front wheel contacts the ground.

In view of the above problems, the invention has a purpose of providing drive torque control capable of avoiding an excess reduction in drive torque during occurrence of a wheelie and thereby realizing an optimum accelerating state. Note that said purpose is merely one example, and interpretation of the invention should not be limited by said purpose.

In order to solve the above problems, first means is a drive torque control method for a vehicle and adopts such a configuration to: detect or compute a wheelie amount of the vehicle; reduce drive torque that is applied to a rear wheel to be lower than the drive torque in a normal state when a wheelie occurs; and maintain or increase the drive torque when the wheelie amount is reduced.

By adopting the configuration as described above, an increase in the wheelie amount is restricted by reducing the drive torque when the wheelie occurs. Then, the drive torque is maintained or increased at a time point at which the wheelie amount is shifted to a reduction. Accordingly, the excess reduction in the drive torque is restricted, a shock that occurs when a front wheel contacts the ground is alleviated, and acceleration failure is avoided.

In addition to the configuration of the first means, second means adopts such a configuration that the drive torque starts being maintained or increased at a time when the wheelie amount is reduced or after a lapse of a specified period from this time of the reduction.

In addition to the configuration of the first means or the second means, third means adopts such a configuration that drive torque control is executed only when the wheelie amount is at least equal to or more than a specified wheelie amount.

In addition to any one of the configurations from the first means to the third means, fourth means adopts such a configuration that the drive torque control is executed only after a lapse of a specified period from occurrence of the wheelie.

In addition to any one of the configurations from the first means to the fourth means, fifth means adopts such a configuration that the wheelie amount is computed by using at least one of information on a pitch angular speed of the vehicle or acceleration in an X-direction, acceleration in a Z-direction, a wheel speed of a front wheel or a rear wheel, wheel acceleration of the front wheel or the rear wheel, the drive torque, a stroke amount of a suspension, and information by a ground sensor.

In addition to the configuration of the fifth means, sixth means adopts such a configuration that reduction timing of the wheelie amount is determined as a time point at which a positive or negative sign of a value of the pitch angular speed is reversed or a time point at which the value of the pitch angular speed exceeds or falls below a specified threshold.

In addition to any one of the configurations from the first means to the sixth means, seventh means adopts such a configuration that an increasing or reducing amount of the drive torque is corrected by using at least one of the pitch angular speed, a pitch angle, the acceleration in the X-direction, the acceleration in the Z-direction, the drive torque, a road surface condition, the wheel speed of the front wheel or the rear wheel, the wheel acceleration of the front wheel or the rear wheel, a bank angular speed, a bank angle, a transmission gear position, the stroke amount of the suspension, and the information by the ground sensor.

Eighth means is a drive torque control device for a vehicle, includes: a wheelie determination section for detecting or computing a wheelie amount of the vehicle; and a control section for reducing drive torque that is applied to a rear wheel to be lower than the drive torque in a normal state when the wheelie occurs, and adopts such a configuration that the control section maintains or increases the drive torque when the wheelie amount is reduced.

In addition to the configuration of the eighth means, ninth means adopts such a configuration that the drive torque starts being maintained or increased by the control section at a time when the wheelie amount is reduced or after a lapse of a specified period from this time of a reduction.

In addition to the configuration of the eighth means or the ninth means, tenth means adopts such a configuration that drive torque control is executed by the control section only when the wheelie amount is at least equal to or more than a specified wheelie amount.

In addition to any one of the configurations from the eighth means to the tenth means, eleventh means adopts such a configuration that the drive torque control is executed by the control section only after a lapse of a specified period from occurrence of the wheelie.

In addition to any one of the configurations from the eighth means to the eleventh means, twelfth means adopts such a configuration that the wheelie amount is computed by the wheelie determination section by using at least one of information on a pitch angular speed of the vehicle or acceleration in an X-direction, acceleration in a Z-direction, a wheel speed of a front wheel or a rear wheel, wheel acceleration of the front wheel or the rear wheel, drive torque, a stroke amount of a suspension, and information by a ground sensor.

In addition to the configuration of the twelfth means, thirteenth means adopts such a configuration that reduction timing of the wheelie amount is determined by the wheelie determination section as a time point at which a sign of the pitch angular speed is reversed or a time point at which the pitch angular speed exceeds or falls below a specified threshold.

In addition to any one of the configurations from the eighth means to the thirteenth means, fourteenth means further includes a drive torque correction section, and adopts such a configuration that an increasing amount of the drive torque is corrected by the control section by using information from the drive torque correction section and that the drive torque correction section computes a correction amount of the drive torque by using at least one of the pitch angular speed, a pitch angle, the acceleration in the X-direction, the acceleration in the Z-direction, the drive torque, a road surface condition, the wheel speed of the front wheel or the rear wheel, the wheel acceleration of the front wheel or the rear wheel, a bank angular speed, a bank angle, a transmission gear position, the stroke amount of the suspension, and the information by the ground sensor.

Fifteenth means is a vehicle and, in addition to any one of the configurations from the eighth means to the fourteenth means, adopts such a configuration that the vehicle further includes a vehicle body, drive means mounted in this vehicle body, and a wheel for receiving drive torque from this drive means.

BRIEF DESCRIPTION OF THE DRAWINGS

FIG. 2 includes charts for explaining the drive torque control method disclosed in FIG. 1, in which FIG. 2(A) depicts time courses of wheel speeds of a front wheel and a rear wheel in a certain example, FIG. 2(B) depicts time courses of a drive torque request by a rider and actual drive torque, and FIG. 2(C) is a chart for depicting a time course of a pitch angular speed of a two-wheeled vehicle.

FIG. 4 depicts a drive torque control device according to the one embodiment of the invention, in which FIG. 4(A) is a block diagram, and FIG. 4(B) is a diagram for explaining three axes of the two-wheeled vehicle.

FIG. 6 includes charts for explaining conventional drive torque control, in which FIG. 6(A) depicts time courses of the wheel speeds of the front wheel and the rear wheel in a certain example, and FIG. 6(B) depicts time courses of the drive torque request by the rider and the actual drive torque.

DETAILED DESCRIPTION

A description will hereinafter be made on a drive torque control method for a vehicle, for example, a two-wheeled vehicle according to one embodiment of the invention with reference to the drawings.

Figure 1:
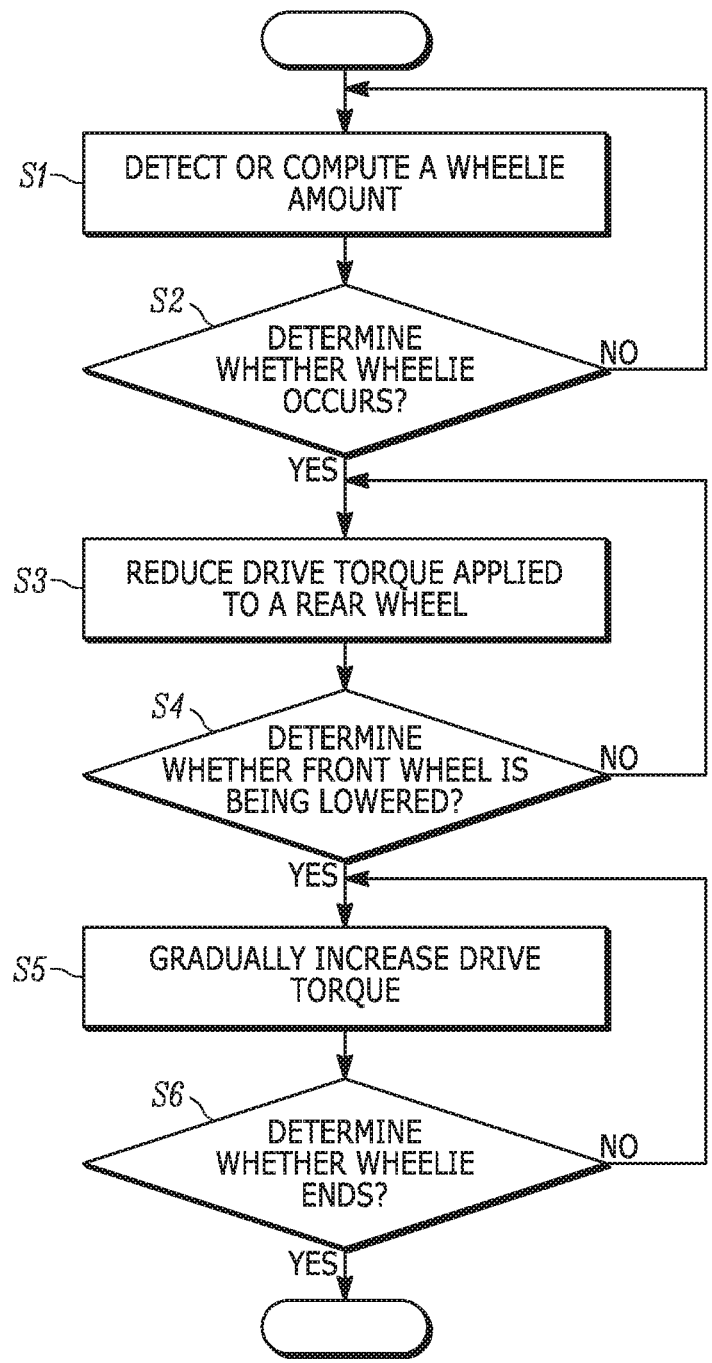
FIG. 1 is a flowchart for explaining a drive torque control method according to one embodiment of the invention.

FIG. 1 is a flowchart for illustrating the drive torque control method according to this embodiment. As depicted in this chart, a wheelie amount is first detected or computed (step S1). Here, the "wheelie amount" is a pitch angle of the two-wheeled vehicle as one example. The "pitch angle" is "0" in a state where a front wheel and a rear wheel contact the ground, and has a positive value in a wheelie state. Thus, when it is described in the specification that "the wheelie amount is large", it means that the pitch angle is large. Note that, due to installation of suspensions in the front and rear wheels of the two-wheeled vehicle, even when the pitch angle is detected or computed to show the positive value, the wheelie does not always occur. It is because the front-wheel suspension is stroked on an expanded side or the rear-wheel suspension is stroked on a contracted side in a process of occurrence of the wheelie. Accordingly, in the actual control, it is assumed that the occurrence of the wheelie is determined if the pitch angle is at least equal to a specified angle, for example.

Next, it is determined whether the wheelie occurs (step S2). If it is determined that the wheelie does not occur (N in step S2), the wheelie amount (the pitch angle) is repeatedly computed. On the other hand, if it is determined that the wheelie occurs (Y in step S2), drive torque that is applied to the rear wheel is reduced (step S3). More specifically, the drive torque that is transmitted from an engine (not depicted) to the rear wheel via a chain, a drive shaft, and the like is reduced. In order to reduce the drive torque, a carburetor, injection, and the like are controlled to reduce output torque of the engine. In addition to the above, fuel injection control, ignition timing control, or current amount control, which is executed when an electric motor is used as drive means, can be replaced by drive power control. Note that the drive torque may start being reduced at the same time as the occurrence of the wheelie or may start being reduced after a lapse of a specified period from the occurrence of the wheelie.

Next, it is determined whether the front wheel is being lowered (step S4). Lowering of the front wheel can be determined by a pitch angular speed. That is, if a value of the pitch angular speed at a certain time point is positive, it means that the front wheel keeps being lifted. On the other hand, if a sign of the pitch angular speed is shifted to be negative, it is understood that the front wheel starts being lowered. If it is determined that the front wheel is not being lowered (N in step S4), the drive torque keeps being reduced (step S3). On the other hand, if it is determined that the front wheel is being lowered (Y in step S4), the drive torque is gradually increased (step S5). It is because lowering of the front wheel is evidence that the wheelie is about to end, and it can be predicted that the wheelie amount is not increased any further even with an increase in the drive torque. The drive torque may start being increased at the same time as lowering of the front wheel or may start being increased after a lapse of a specified period from lowering of the front wheel.

Lowering of the front wheel can be determined not only by the pitch angular speed but also by information such as the pitch angle. That is, a comparison is made between the pitch angle at a certain time point and the pitch angle after the lapse of a specified period. If the pitch angle is increased, it is understood that the front wheel keeps being lifted. If the pitch angle is reduced, it is understood that the front wheel is being lowered.

Next, it is determined whether the wheelie ends (step S6). Whether the wheelie ends can also be determined by the pitch angular speed or the pitch angle of the two-wheeled vehicle. If it is determined that the wheelie has not ended (N in step S6), it is determined again whether the front wheel is being lowered (step S4). If the front wheel keeps being lowered (Y in step S4), the drive torque is further increased (step S5). Then, it is determined again whether the wheelie ends (step S6). If it is determined that the wheelie ends (Y in step S6), the drive torque control of this embodiment is terminated.

Figure 2:
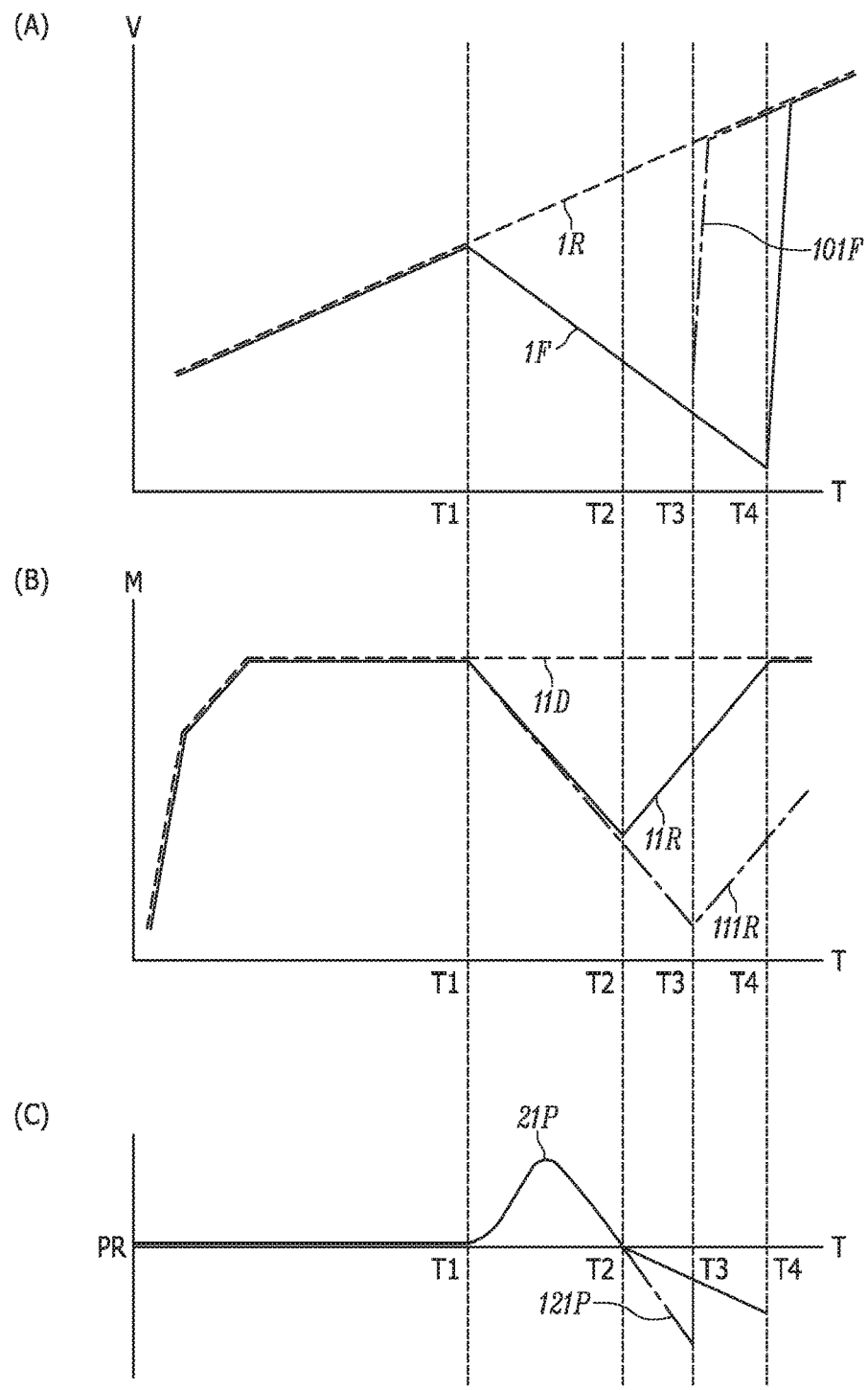

FIG. 2 includes charts for explaining relationships among time courses of wheel speeds of the front and rear wheels, the drive torque, and the pitch angular speed at a time when the drive torque control as described above is executed. In FIG. 2(A), a horizontal axis indicates time T, and a vertical axis indicates a wheel speed V. Here, a line indicated by a solid line represents a wheel speed 1F of the front wheel by the drive torque control according to this embodiment. In addition, a line indicated by a broken line represents a wheel speed 1R of the rear wheel, and a line indicated by a one-dot chain line represents a wheel speed 101F of the front wheel by torque control of the related art. In this example, such a case is assumed that the wheel speed 1R of the rear wheel is increased at constant acceleration even after the occurrence of the wheelie.

As it is understood from FIG. 2(A), before the occurrence of the wheelie (until time T1), the front wheel is driven along with traveling of the two-wheeled vehicle, and thus the front wheel and the rear wheel are at substantially the same wheel speed. Meanwhile, the wheel speed 1F of the front wheel keeps being reduced from the time T1 to time T4, and becomes equal to the wheel speed 1R of the rear wheel immediately after the time T4. This is because the wheelie occurs at the time T1, and the front wheel comes off a road surface, but the wheelie ends at the time T4. By the way, as it is understood from the line of the one-dot chain line in FIG. 2(A), compared to this example, the wheel speed 101F of the front wheel matches the wheel speed 1R of the rear wheel at time T3, which is earlier than the time T4, in the drive torque control by the related art. This is because timing to increase the drive torque is late and, when compared to the drive torque control according to this embodiment, the front wheel contacts the road surface at the time T3. Note that, in a case of the two-wheeled vehicle that is equipped with traction control, drive power control by feedback control may be interfered when a wheel speed difference is generated between the front and rear wheels. However, in this embodiment, the occurrence of the wheelie is detected on the basis of information on the pitch angular speed, and, in this case, the feedback control of the traction control becomes temporarily invalid. In this way, the drive torque control according to this embodiment is preferentially executed.

FIG. 2(B) indicates a time course of the drive torque that is applied to the rear wheel. In FIG. 2(B), a horizontal axis indicates the time T, and a vertical axis indicates drive torque M. Here, in FIG. 2(B), a line indicated by a solid line represents drive torque 11R by the drive torque control according to this embodiment. In addition, a line indicated by a broken line represents a drive torque request 11D by the rider. Furthermore, a line indicated by a one-dot chain line represents the drive torque 111R by the related art. In this FIG. 2(B), it is assumed that the drive torque request 11D by the rider is constant from the time T1 to the time T4. However, in a period from the time T1 to the time T2, the drive torque 11R that is applied to the rear wheel is gradually reduced. The period from the time T1 to the time T2 is a period in which the wheelie amount is increased as will be described below. Accordingly, an increase in the wheelie amount is prevented by reducing the drive torque.

In addition, in a period from the time T2 to the time T4, the drive torque 11R that is applied to the rear wheel is gradually increased. The time T2 is a time point at which the wheelie amount is shifted to a reduction as will be described below. When the wheelie amount starts being reduced, the wheelie amount is not usually increased even with an increase in the drive torque 11R. Thus, the drive torque that is applied to the rear wheel is increased at a constant rate in the drive torque control of this embodiment. Note that the increasing rate of the drive torque is corrected on the basis of various parameters as will be described below. Meanwhile, according to the drive torque control according to the related art, the drive torque 111R keeps being reduced until the time T3. This is because control for reducing the drive torque 111R is continuously executed until the time T3, until which the wheelie occurs. Then, control for increasing the drive torque 111R is started at the time T3. In this point, the drive torque control of the related art differs from the drive torque control of this embodiment in which the drive torque 11R starts being increased from the time T2, which is earlier timing than the time T3.

Furthermore, FIG. 2(C) indicates a time course of the pitch angular speed of the two-wheeled vehicle. In FIG. 2(C), a horizontal axis indicates the time T, and a vertical axis indicates a pitch angular speed PR. In the chart, a solid line represents the pitch angular speed in a case of the drive torque control of this embodiment. Here, the pitch angular speed is an angular speed in a pitching direction at a time when the two-wheeled vehicle leans forward or makes the wheelie. A pitch angular speed 21P is approximately "0" until the time T1. This indicates a state where the wheelie does not basically occur. In addition, the pitch angular speed 21P shows a positive value from the time T1 to T2. This indicates that the wheelie occurs and further the wheelie amount is increased. Because the front wheel comes off the road surface in conjunction with this, the wheel speed of the front wheel starts being reduced (see FIG. 2(A)).

Next, the pitch angular speed 21P becomes "0" at the time T2. That the pitch angular speed 21P is "0" means that the front wheel stops being lifted any further. According, the maximum wheelie amount is obtained at the time T2. Then, the pitch angular speed 21P shows a negative value from the time T2 to the time T4. That is, this means that the front wheel starts being lowered at the time T2. Accordingly, the wheelie amount starts being reduced at the time T2. At a time when the wheelie amount is reduced or after a lapse of a specified period from the reduction in the wheelie amount, the drive torque control for increasing the drive torque 11R is started (see the solid line in FIG. 2(B)). A reason why the pitch angular speed 21P suddenly becomes "0" at the time T4 is because the front wheel contacts the road surface and the pitch angle of the two-wheeled vehicle is no longer changed. Note that positive and negative signs of the pitch angular speed 21P are merely used for convenience of the description. Thus, in order to identify a time point at which the front wheel starts being lowered, a time point at which the sign of the pitch angular speed 21P is reversed only needs to be determined.

Note that a one-dot chain line in FIG. 2(C) forms a chart of a pitch angular speed 121P by the drive torque control of the related art, and a negative slope of the pitch angular speed is steep (a lowering speed of the front wheel is high) in comparison with that of this embodiment. This is because drive torque increasing control as in this embodiment is not executed until the time T3 and the front wheel is lowered at the high pitch angular speed 121P. Then, the front wheel contacts the road surface immediately after the time T3, and the pitch angular speed becomes "0".

Note that a case where the drive torque is increased in conjunction with the reduction in the wheelie amount has been described in the above-described embodiment. However, the invention is not limited thereto but includes control for maintaining the drive torque to be the drive torque at that time point. This is because, even with such control, acceleration failure can favorably be avoided in comparison with a case where the drive torque keeps being reduced until the end of the wheelie as in the related art.

Figure 3:
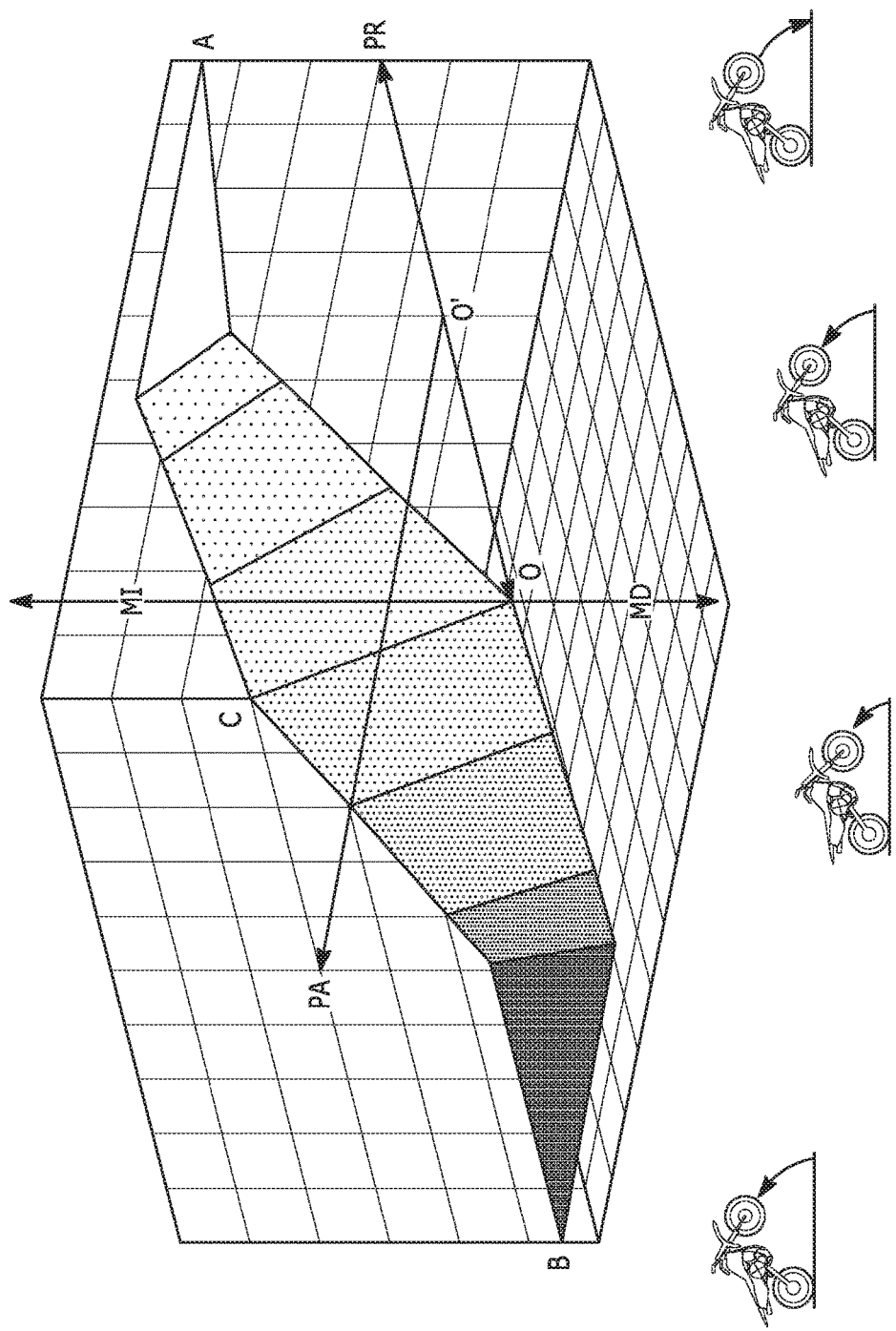
FIG. 3 is a diagram for depicting states of the two-wheeled vehicle and a control map of an increasing or reducing amount of the drive torque in the drive torque control method disclosed in FIG. 1.

Next, a description will be made on one example of a control map of the drive torque control according to this embodiment on the basis of FIG. 3. In said control map, a horizontal axis indicates the pitch angular speed PR, a longitudinal axis indicates a pitch angle PA, and a vertical axis indicates an increasing amount MI and a reducing amount MD of the drive torque. At an origin O', both of the pitch angular speed and the pitch angle are "0". At a point O in this control map, the pitch angular speed is high in an increasing direction, and the pitch angle is "0". In this case, such a possibility that the pitch angle is abruptly increased at a next moment to cause a wheelie state is very high, and thus the drive torque is not increased. Next, a point A indicates a case where the pitch angular speed is high in a reducing direction and the pitch angle is "0". This is a state where the front wheel is lowered at the high pitch angular speed and immediately before the wheelie ends. Because the wheelie is not increased any further in such a state, the increasing amount of the drive torque reaches the maximum.

In addition, a point B indicates a case where the pitch angular speed is high in the increasing direction and the pitch angle is large. This can also be said as a case where the wheelie amount shows the maximum value. In this case, the reducing amount of the drive torque is the maximum. It is because, if the drive torque is further increased or is maintained, the wheelie amount is further increased, and a posture of the two-wheeled vehicle possibly becomes unstable. Furthermore, a point C indicates a case where the pitch angular speed is high in the reducing direction and the pitch angle is large. This is a case where the front wheel is being lowered at the high angular speed in a state where the wheelie amount is large. It can be said that the vehicle is still in the unstable state in this case. Accordingly, the increasing amount of the drive torque is 0, and the drive torque is not increased.

Figure 4:
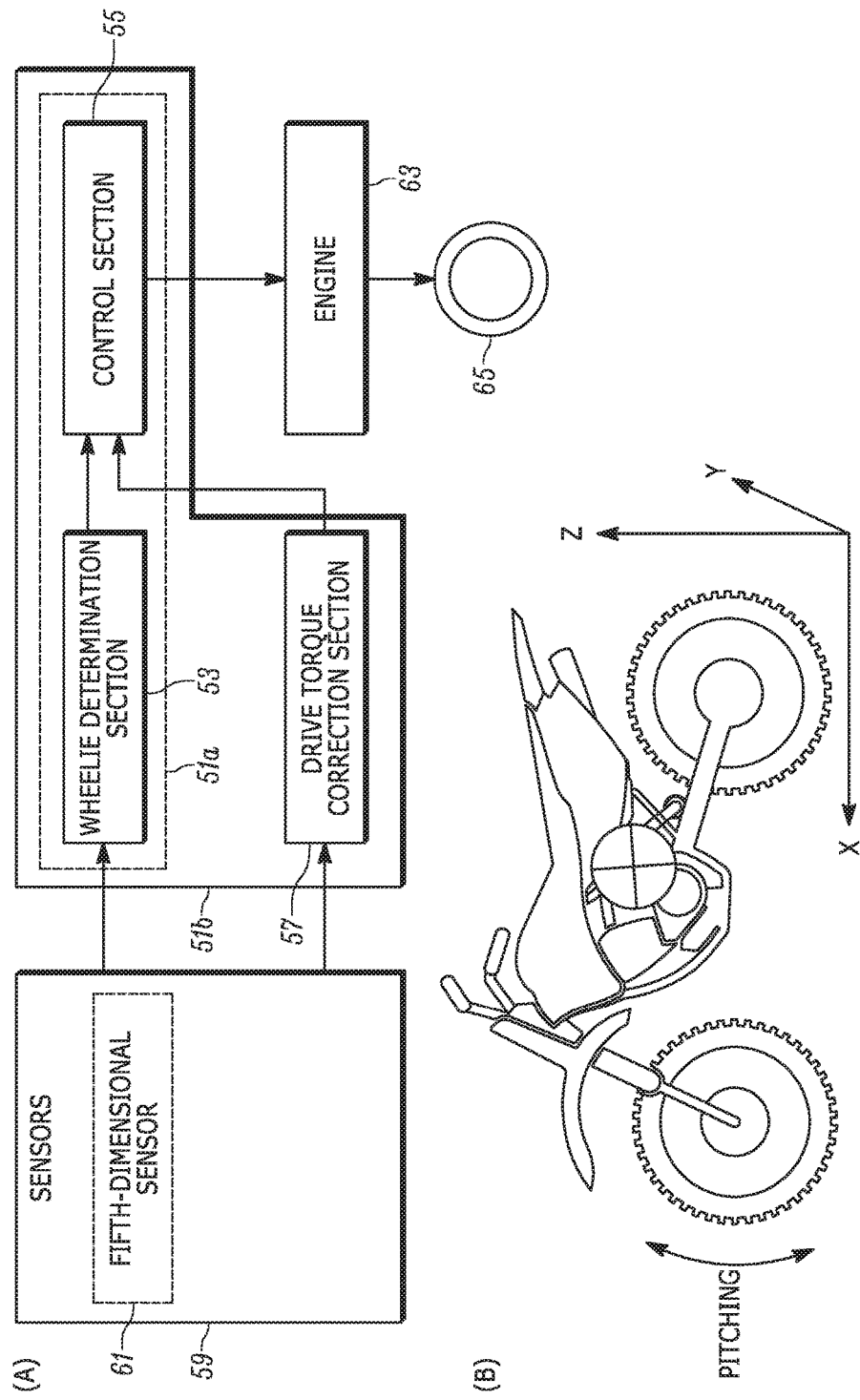

FIG. 4 is a block diagram that includes a drive torque control device 51a for realizing the drive torque control according to this embodiment. As it is understood from this diagram, the drive torque control device 51a includes a wheelie determination section 53 and a control section 55 for controlling the drive torque on the basis of information from the wheelie determination section 53. Note that the control section 55 may have a function of executing another control for the two-wheeled vehicle in addition to the drive torque control. In addition to the wheelie determination section 53 and the control section 55, a drive torque correction section 57 may be provided. The drive torque correction section 57 corrects the increasing or reducing amount of the drive torque on the basis of various parameters of the two-wheeled vehicle. Accordingly, the control section 55 receives output of the drive torque correction section 57. Note that, although the drive torque correction section 57 and the control section 55 are depicted as separate components in FIG. 4, the drive torque correction section 57 may be incorporated in the control section 55.

The wheelie determination section 53 detects or computes at least one of the wheelie amount, a change in the wheelie amount, and the like on the basis of information from various sensors 59 that are attached to the two-wheeled vehicle, and determines whether the wheelie occurs. As examples of the sensors 59 that are used to determine the wheelie, an X-direction acceleration sensor, a Z-direction acceleration sensor, a pitch angular speed sensor, a front/rear wheel speed sensor, a drive torque sensor, a suspension stroke sensor, a ground sensor, a transmission gear position sensor, and the like are used. In this embodiment, a fifth-dimensional sensor 61, in which an X-Y-Z three-dimensional acceleration sensor and angular acceleration sensors around an X-axis and a Y-axis are combined, is used. However, because the wheelie and the like can be detected or computed from information other than that from the fifth-dimensional sensor 61, the information from the above various sensors 59 may be used in addition to the information from the fifth-dimensional sensor 61 or instead of the information from the fifth-dimensional sensor 61.

In this embodiment, information on the angular acceleration around the Y-axis is used as one example. A direction of each of the X-axis, the Y-axis, and a Z-axis is depicted in FIG. 4(B). That is, the X-axis corresponds to a front/rear direction of the two-wheeled vehicle, the Y-axis corresponds to a width direction of the two-wheeled vehicle, and the Z-axis corresponds to a height direction of the two-wheeled vehicle. The fifth-dimensional sensor 61 is installed near a center of gravity of the two-wheeled vehicle. When the wheelie occurs, a vehicle body pitches, and the angular acceleration around the Y-axis is detected. The angular acceleration detected here is subjected to time integration, and thereby the pitch angle (an inclination angle of the vehicle body) as the wheelie amount can be computed in real time. In addition, the detected angular speed is subjected to time differentiation, and thereby the angular acceleration around the Y-axis is computed in real time.

In this embodiment, as described above, it is important to identify the time point at which the front wheel starts being lowered after the occurrence of the wheelie. It is because this time point is a time point at which the wheelie amount is reduced. Accordingly, the wheelie determination section 53 computes the angular speed around the Y-axis in real time, and identifies a time point at which the pitch angular speed is shifted from being positive (a state where the wheelie amount is increased) to being negative (a state where the wheelie amount is reduced). When it is determined that the wheelie amount is reduced, the wheelie determination section 53 transmits a signal indicating that the wheelie amount is reduced to the control section 55. In this embodiment, the drive torque at the time when the wheelie occurs is reduced in comparison with the drive torque in a normal state. However, when the control section 55 receives the signal indicative of the reduction in the wheelie amount, the drive torque increasing control is executed. More specifically, a specified signal is transmitted to the engine so as to increase the drive torque. In this way, it is possible to prevent an excess reduction in the drive torque that is applied to the rear wheel and to avoid a shock during the contact of the front wheel with the road surface and the acceleration failure.

Next, a description will be made on the drive torque correction section 57. The drive torque correction section 57 corrects the increasing/reducing amount of the drive torque at the time when the wheelie occurs. The increasing/reducing amount of the drive torque cannot unambiguously be determined by the wheelie amount, but various corrections need to be made thereto depending on a traveling state of the two-wheeled vehicle. Various parameters can be considered for the correction, and examples thereof include the pitch angular speed, the pitch angle, the acceleration in the X-direction, the acceleration in the Z-direction, the drive torque, a road surface condition, the wheel speed of the front wheel or the rear wheel, wheel acceleration of the front wheel or the rear wheel, a bank angular speed, a bank angle, the transmission gear position, a stroke amount of the suspension, information from the ground sensor, and the like. A speed and acceleration of the two-wheeled vehicle can be computed by using the information from the fifth-dimensional sensor. The bank angle and the bank angular speed can also be computed by using the information from the angular acceleration sensor around the X-axis as the fifth-dimensional sensor. The transmission gear position can be obtained from the transmission gear position sensor.

Various correction methods of the drive torque can be considered. For example, when the speed of the two-wheeled vehicle is high, the drive torque is corrected to be reduced. When the acceleration of the two-wheeled vehicle is high, the drive torque is also corrected to be reduced. This is because the wheelie needs to end in an earlier stage as the speed or the acceleration is increased. When the bank angle is large, the drive torque is also corrected to be reduced in comparison with that in an upright state. It is because such inconvenience as slippage of the rear wheel occurs when the bank angle is large and the drive torque is high. Meanwhile, regarding the transmission gear position, the drive torque is corrected to be reduced as the transmission gear position is lowered (the transmission gear position for a lower gear is selected). This is because the higher drive torque is transmitted to the rear wheel and the wheelie amount is more likely to be increased as the transmission gear position is lowered.

The signal from the drive torque correction section 57 is transmitted to the control section 55 and is received by the control section 55 together with the signal from the wheelie determination section 53. The control section 55 computes the increasing/reducing amount of the drive torque on the basis of the signal from the wheelie determination section 53, and makes a correction to obtain final drive torque on the basis of the signal from the drive torque correction section 57. Then, a signal that corresponds to this final drive torque is transmitted to an engine 63. In the engine 63, an electronic carburetor or injector receives the signal from the control section 55 and supplies necessary fuel, air, and the like to a cylinder (not depicted) of the engine 63. Then, drive torque from the engine 63 is transmitted to a rear wheel 65. Note that the drive torque correction section 57 is separately provided from the wheelie determination section 53 in the example in FIG. 4. However, the drive torque correction section 57 may be incorporated in the wheelie determination section 53 to constitute a unit. In addition, the wheelie determination section 53, the control section 55, and the drive torque correction section 57 may be combined to constitute a drive torque control device 51b.

Figure 5:
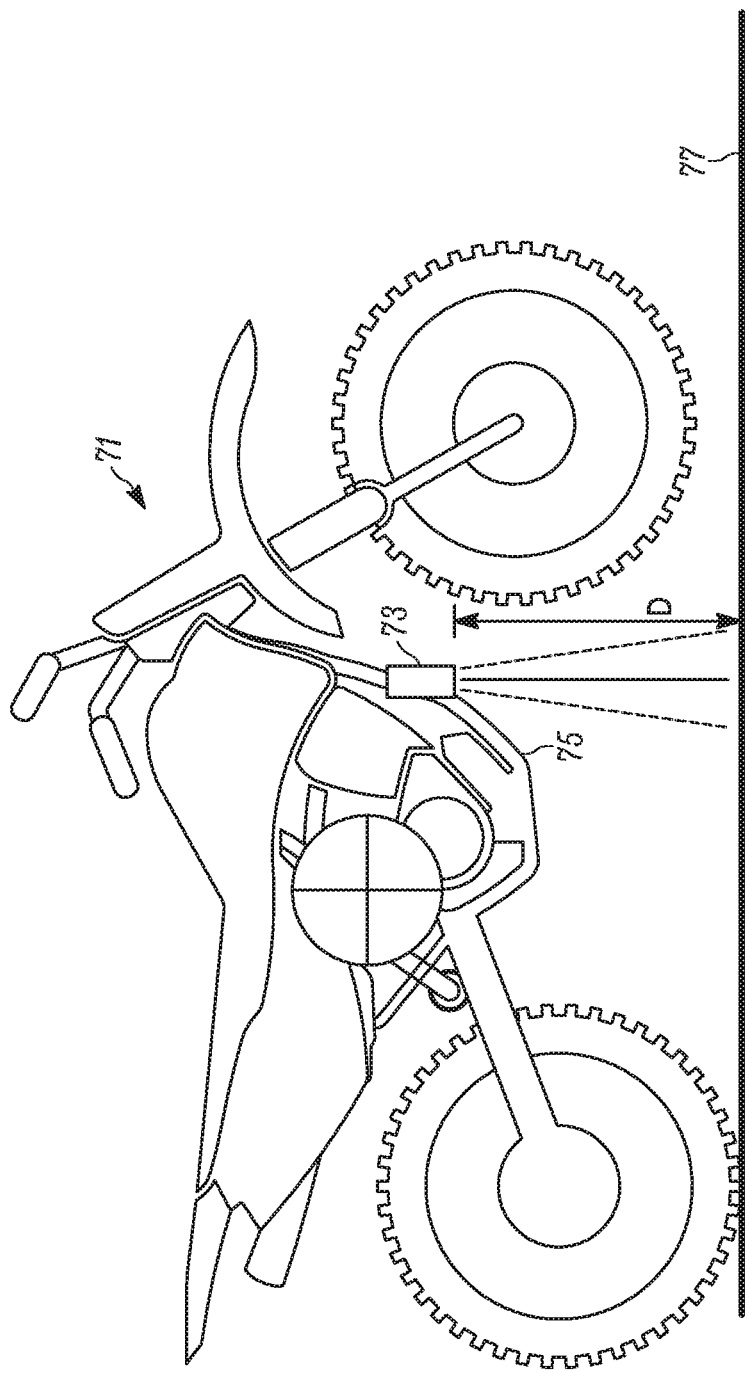
FIG. 5 is a diagram of the two-wheeled vehicle of this embodiment that includes a ground sensor.
Figure 6:
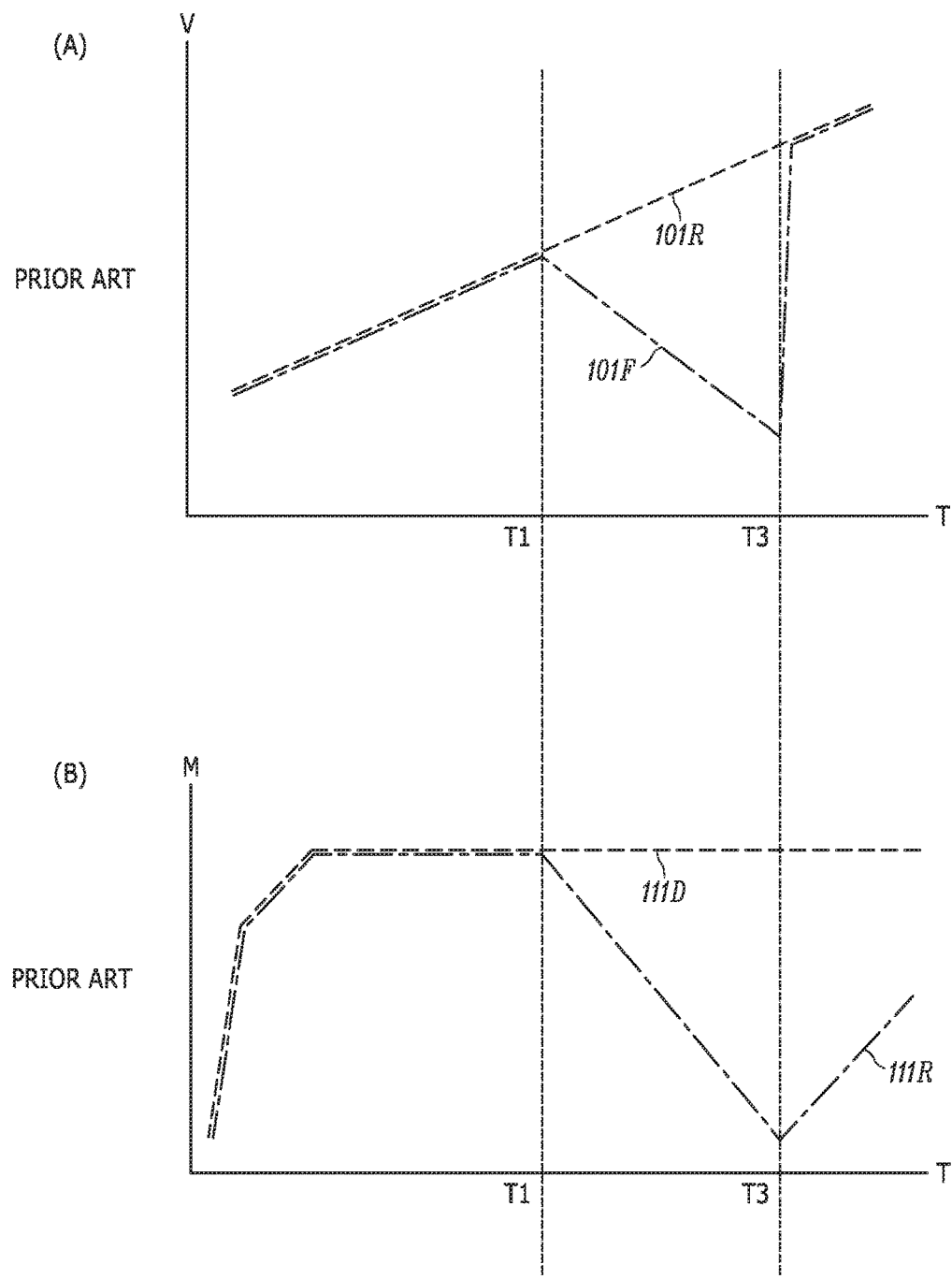

FIG. 5 is a view for explaining a case where a ground sensor 73 is installed on a vehicle body of a two-wheeled vehicle 71. Here, the "ground sensor" 73 is a sensor that is attached to the vehicle body so as to directly detect the wheelie amount. In this embodiment, a distance sensor is installed on a down tube 75 of a frame, and a distance D between the ground sensor 73 and a road surface 77 is measured in real time. When a distance detected by the ground sensor 73 is longer than the distance D from the road surface 77 in the normal state (a state where the wheelie does not occur), it can be predicted that the wheelie occurs. In addition, when a reduction in the distance D from the road surface 77 is detected, a time point at which the wheelie amount is reduced can be identified.

The above description has basically been focused on the drive torque control for the two-wheeled vehicle. However, the invention can also be applied to a three-wheeled vehicle (a tricycle) and a four-wheeled vehicle. In addition, the above description has been made in detail on the two-wheeled vehicle that is equipped with the engine as the example. However, the invention can also be applied to a vehicle that has an electric motor as drive means and to a vehicle that uses another drive mean.

The invention can be used for the drive torque control for the vehicle and, in particular, to control the drive torque that is applied to the rear wheel when the wheelie occurs.

The invention claimed is:

1. A drive torque control method for a vehicle, the method comprising:
   detecting or computing a wheelie amount of the vehicle;
   performing drive torque control to gradually reduce drive torque that is applied to a rear wheel when the wheelie amount increases;
   determining whether a front wheel of the vehicle is being lowered; and
   maintaining or increasing the drive torque when the front wheel of the vehicle is being lowered, wherein an increasing or reducing amount of the drive torque is corrected by using at least one selected from a group consisting of a pitch angular speed, a pitch angle, an acceleration in an X-direction, an acceleration in a Z-direction, the drive torque, a road surface condition, a wheel speed of the front wheel or the rear wheel, the wheel acceleration of the front wheel or the rear wheel, a bank angular speed, a bank angle, a transmission gear position, a stroke amount of a suspension, and information by a ground sensor.

2. The method according to claim 1, wherein the drive torque starts being maintained or increased after a lapse of a specified period from determining the lowering of the front wheel of the vehicle.

3. The method according to claim 1, wherein the drive torque control is executed only when the wheelie amount is at least equal to or more than a specified wheelie amount.

4. The method according to claim 1, wherein the drive torque control is executed only after a lapse of a specified period of time after the wheelie amount increases.

5. The method according to claim 1, wherein the wheelie amount is computed by using at least one of information on a pitch angular speed of the vehicle or acceleration in an X-direction, acceleration in a Z-direction, a wheel speed of the front wheel or the rear wheel, wheel acceleration of the front wheel or the rear wheel, drive torque, a stroke amount of a suspension, and information by a ground sensor.

6. The method according to claim 5, wherein determining whether the front wheel of the vehicle is being lowered is determined as a time point at which a positive or negative sign of a value of the pitch angular speed is reversed or a time point at which the value of the pitch angular speed exceeds or falls below a specified threshold.

7. A drive torque control device for a vehicle, the torque control device comprising:
   an electronic processor configured to
      detect or compute a wheelie amount of the vehicle;
      perform drive torque control for gradually reducing drive torque that is applied to a rear wheel in a state that the wheelie amount increases,
      determine whether a front wheel of the vehicle is being lowered,
      maintain or increase the drive torque when the front wheel of the vehicle is being lowered;
      correct an increasing amount of the drive torque, and
      compute a correction amount of the drive torque by using at least one selected from a group consisting of a pitch angular speed, a pitch angle, an acceleration in an X-direction, an acceleration in a Z-direction, the drive torque, a road surface condition, a wheel speed of the front wheel or the rear wheel, a wheel acceleration of the front wheel or the rear wheel, a bank angular speed, a bank angle, a transmission gear position, a stroke amount of a suspension, and information by a ground sensor.

8. The device according to claim 7, wherein the drive torque starts being maintained or increased after a lapse of a specified period from determining the lowering of the front wheel of the vehicle.

9. The device according to claim 7, wherein drive torque control is executed only when the wheelie amount is at least equal to or more than a specified wheelie amount.

10. The device according to claim 7, wherein performing drive torque control is executed only after a lapse of a specified period of time after the wheelie amount increases.

11. The device according to claim 7, wherein the electronic processor is configured to compute the wheelie amount by using at least one selected from a group consisting of information on a pitch angular speed from an angular speed sensor of the vehicle or acceleration in an X-direction, acceleration in a Z-direction, a wheel speed of the front wheel or the rear wheel, wheel acceleration of the front wheel or the rear wheel, the drive torque, a stroke amount of a suspension, and information by a ground sensor.

12. The device according to claim 11, wherein the electronic processor is configured to determine whether the front wheel of the vehicle is being lowered as a time point at which a sign of the pitch angular speed is reversed or a time point at which the pitch angular speed exceeds or falls below a specified threshold.

13. A vehicle comprising:
a vehicle body;
drive means mounted in the vehicle body;
a wheel for receiving drive torque from the drive means; and
the drive torque control device according to claim 7.

* * * * *